Patented Nov. 21, 1950

2,530,627

UNITED STATES PATENT OFFICE 2,530,627

PRODUCTION OF N-ACYL ALLOTHREONINE ESTERS

Karl Pfister, III, and Max Tishler, Westfield, N. J., assignors to Merck & Co., Inc., Rahway, N. J., a corporation of New Jersey No Drawing. Original application September 6, 1946, Serial No. 695,286. Divided and this application July 2, 1948, Serial No. 36,804

6 Claims. (Cl. 260—471)

This invention is concerned generally with novel chemical compounds and processes of preparing the same; more particularly it relates to a new and improved process for manufacturing α-amino-β-hydroxy-carboxylic acids, such as threonine.

This application is a division of my co-pending application Serial No. 695,286, filed September 6, 1946, now abandoned.

Threonine is one of the two theoretically possible stereoisomeric racemates of the chemical compound α-amino-β-hydroxy-butyric acid, the other racemate being known as allothreonine. The individual stereoisomers can be represented by the following structural formulae in which the groups around the asymmetric carbon atoms are arranged in a plane in the manner customarily employed in sugar chemistry:

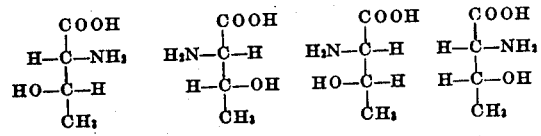

1 (+) threonine   d (−) threonine   d and l allothreonine

The above are in conformance with the conventional formulae used for representing sugars as demonstrated by Meyer and Rose (J. Biol. Chem. 115, 721 (1936)), who showed that d(−)-threonine is configurationally similar to d(−)-threose.

It is known that α-amino-β-hydroxy-butyric acid can be prepared in fairly good over-all yield from relatively inexpensive starting materials, but these methods are unsatisfactory for manufacturing purposes in view of the fact that the product obtained is predominately allothreonine. For example, the method of West et al. (J. Biol. Chem. 122, 605 (1938)) gives stereoisomeric racemates which consist of less than 5% of threonine. Methods are known for converting allothreonine to threonine, as for example, the method of Carter et al. (J. Biol. Chem. 129, 362 (1930)), but this method gives very poor yields and is relatively expensive to operate. It involves a deep-seated destruction of the allothreonine molecule which is later resynthesized to obtain a threonine derivative.

Processes are known for preparing α-amino-β-hydroxy-butyric acid racemates, but the product contains a minor proportion of threonine. For example, it is reported that threonine can be synthesized by high pressure catalytic hydrogenation of α-oximino-acetoacetic ester, (J. A. C. S., 60, 1930 (1938)), but the product actually obtained by this process has been demonstrated by the present applicants to be allothreonine containing about 15–20% threonine impurity. This process suffers from other disadvantages, namely: (1) it is difficult and hazardous to prepare the unstable oximino starting material; (2) high pressure hydrogenation is expensive and difficult to carry out. Org. Syn. 20, 101, describes an operable process for preparing threonine: In this process, the mercuric acetate addition compound of crotonic acid is brominated to produce a mixture of stereoisomeric racemates of α-bromo-β-methoxy-butyric acid which contains approximately 40% precursor of threonine, and 60% precursor of allothreonine. Amination of the mixture followed by hydrolysis yields a mixture of α-amino-β-hydroxy-butyric acids which contain threonine in approximately 30% yield (bioassay). Isolation of threonine from this mixture is difficult and is accomplished by formylation followed by fractional crystallization; the over-all yield from crotonic acid is limited to about 17.5% of theory.

In accordance with the present invention threonine can be manufactured from β-keto-butyric esters in over-all yields of almost 60% of the theoretical. It is a further embodiment of this invention, that applicants' process is generally applicable for preparing threonine and other α-amino-β-hydroxy carboxylic acids from β-keto-carboxylic acid derivatives, as for example nitriles, esters, substituted amides, and the like.

The preparation of threonine and other β-hydroxy-α-amino-carboxylic acids is carried out by reactions indicated generically as follows:

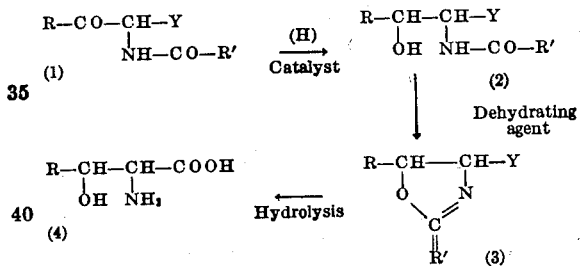

In the above formulae, R is a radical selected from the group which consists of alkyl, aryl and aralkyl radicals, R' is a radical selected from the group which consists of alkyl, aryl, aralkyl and hydrogen radicals, and Y is a radical convertible to carboxyl by hydrolysis.

Threonine is synthesized according to the reactions indicated generically above, as follows: An α-acylamido-β-keto-butyric acid derivative (1) is reacted with hydrogen in contact with a hydrogenation catalyst to form a mixture of stereoisomers of the corresponding α-acylamido-β-hydroxy-butyric ester, nitrile or substituted amide; (2); this mixture can be hydrolyzed directly to produce a mixture of stereoisomers of α-amino-β-hydroxy-butyric acid (4), which contains a major proportion of allothreonine and a minor proportion of threonine; the α-acylamido-β-hydroxy-butyric acid derivative is preferably reacted with a dehydrating and cyclizing agent to produce a 5-methyl-oxazoline compound (3) containing a 4-position grouping hydrolyzable to carboxyl and an aryl, alkyl, or aralkyl substituent or hydrogen, in the 2-position; when this oxazoline is hydrolyzed, a mixture of racemates of threonine and allothreonine, similar to that described above, is obtained, but in this case, the proportion of the threonine and the allothreonine is reversed. Other α-amino-β-hydroxy-carboxlic acids can be synthesized according to the above process starting with the appropriate β-keto-carboxylic acid derivative.

In carrying out the process according to the present invention, an α-acylamido-β-keto-butyric ester, such as ethyl α-formamido-β-keto-butyrate, benzyl α-formamido-β-keto-butyrate, methyl α-acetamido-β-keto-butyrate, tolyl α-acetamido-β-keto-butyrate, benzyl α-propionamido-β-keto-butyrate, phenyl α-butyramido-β-keto-butyrate, methyl α-benzamido-β-keto-butyrate, ethyl α-benzamido-β-keto-butyrate, butyl α-phenacetamido-β-keto-butyrate, and the like, which can be prepared according to the processes described in our co-pending application, Serial No. 662,621, filed April 16, 1946, now U. S. Patent 2,489,927, is reacted with hydrogen in contact with a hydrogenation catalyst to produce a mixture of N-acyl-dl-threonine ester and N-acyl-dl-allothreonine ester, in proportions varying with the conditions of hydrogenation. The amount of dl-threonine precursor in the hydrogenation mixture is determined by a modification of a new assay procedure currently reported in J. Biol. Chem., 160, 35–49 (1945), which describes a method for assaying the 10 essential amino acids which include d(−)threonine. (In this article the physiologically active threonine is referred to as l-threonine.) The hydrogenation product which is substantially pure α-acylamido-β-hydroxy-butyric ester, and which consists of a mixture of N-acyl-dl-threonine ester and N-acyl-dl-allothreonine ester, is hydrolyzed and the hydrolyzed material assayed microbially for d(−)threonine. The amount of dl-threonine is equal to twice the d(−)threonine and the remaining material can be assumed to be dl-allothreonine. The proportions of dl-threonine precursor obtained by low pressure hydrogenation of α-acylamido-β-keto-butyric esters in aqueous solution vary depending upon the catalyst used. For example, the proportion of dl-threonine precursor obtained by reduction of ethyl α-acetamido-β-keto-butyrate, ranges from a maximum of about 35% using Raney nickel, to a minimum of about 15–25% using platinum oxide.

It is presently preferred to employ reduction conditions which will result in a maximum yield of the N-acyl-allothreonine ester because the subsequent conversion to the oxazoline (3) causes an inversion of said allo derivative to the oxazoline precursor of threonine. When an α-acylamido-β-ketobutyric acid ester is reduced in the presence of platinum oxide, the product containing about 80–85% of N-acyl-dl-allothreonine ester, from which dl-threonine and dl-allothreonine may be obtained by hydrolysis, is obtained as a colorless oil.

The reduction is conveniently carried out at room temperature and under low hydrogen pressure, employing an aqueous solution or water-miscible organic solvent, such as ethyl alcohol, acetic acid, and the like. Best results are obtained in aqueous solution by adding a small amount of alkali or alkaline earth hydroxide or carbonate, such as sodium hydroxide, potassium carbonate, barium hydroxide and the like, to the reduction mixture since otherwise the reduction may go very slowly. Although it is preferred to use platinum oxide, other hydrogenation catalysts such as nickel, or platinum can be used. The α-acylamido-β-hydroxy-butyric ester is isolated from the reaction mixture by first removing the catalyst by filtration and then evaporating the filtrate to dryness whereby the desired compound is obtained in crude form. The crude product can be separated from the inorganic salts by extraction with a hydrophobic solvent, such as benzene. The benzene solution is conveniently dried by distilling a portion of the benzene which removes the traces of water azeotropically. This dry benzene solution can be employed directly for preparing the oxazoline compound, or, if desired, can be evaporated to produce substantially pure α-acylamido-β-hydroxy-butyric ester which is obtained as an oil, from which crystals of N-acyl-dl-allothreonine ester separate on standing, and which can be purified by recrystallization from a solvent, as for example, ethyl acetate. The proportion of N-acyl-dl-threonine ester is too low (about 15–20%) to make its isolation from the reaction mixture practicable, although its presence can be demonstrated by the bio-assay method above described.

The α-acylamido-β-hydroxy-butyric ester is converted to the corresponding oxazoline derivative by treating the crude hydrogenation product (after removal of the catalyst and aqueous or alcoholic solvent) with a dehydrating and cyclizing agent such as thionyl chloride, phosphorus pentachloride, phosphorus pentoxide, phosphorus trichloride, and the like. The above procedure can be conducted either employing the dehydrating and cyclizing agent alone or in conjunction with a hydrocarbon solvent such as benzene, toluene, and the like; the crude hydrogenation product may, if desired, be purified as described above and the purified N-acyl-dl-allothreonine ester used in the reaction. Where the crude hydrogenation product is employed, it is convenient in commercial operation after distillation of the water from the solution of the hydrogenation product, to extract the residue with said hydrocarbon solvent and to distill the hydrocarbon solvent solution to remove traces of water azeotropically; this solution is then treated with the dehydrating agent. It is presently preferred to use thionyl chloride in this reaction whereby an extremely high yield of the 5-methyl-4-carboxy-oxazoline ester, containing an aryl, alkyl or aralkyl substituent or hydrogen in the 2-position, is produced.

When the α-acylamido-β-keto-butyric ester starting materials recited on page 4 are hydrogenated as described above, and the resulting α-acylamido-β-hydroxy butyric ester reacted with a dehydrating and cyclizing agent, as described above, the corresponding 5-methyl-4-carboxy-oxazoline esters are obtained. For example, ethyl α-formamido-β-keto-butyrate yields 5-methyl-4-carboethoxy-oxazoline; benzyl α-formamido-β-keto-butyrate yields 5-methyl-4-carbobenzoxy-oxazoline; tolyl-α-acetamido-β-keto-butyrate yields 5-methyl-4-carbotoloxy-2-methyl oxazoline; phenyl α-butyramido-β-keto-butyrate yields 5-methyl-4-carbophenoxy-2-propyl-oxazoline; and methyl α-benzamido-β-keto-butyrate yields 5-methyl-4-carbomethoxy-2-phenyl-oxazoline.

Said 5-methyl-4-carboxy-oxazoline esters containing alkyl, aryl or aralkyl substituents or hydrogen in the 2-position are conveniently isolated from the thionyl chloride or thionyl chloride-benzene reaction mixture by pouring said reaction mixture into anhydrous ether, whereupon the hydrochloride of the oxazoline compound precipitates and can be recovered. This crude product can be hydrolyzed without further treatment, or if desired, can be purified by redissolving in chloroform and precipitating therefrom by diluting the chloroform solution with ether. When the α-acyl-dl-allothreonine ester is purified before conversion to the oxazoline, the product is substantially pure oxazoline precursor of dl-threonine.

Either the crude or the purified oxazoline compound above described can be hydrolyzed by heating with water alone, in alkaline solution or with aqueous mineral acid such as dilute hydrobromic acid, dilute sulfuric acid and the like; it is presently preferred to employ dilute hydrochloric acid. The hydrolysis product can be analyzed directly by the bioassay method to determine its content of dl-threonine. Control experiments show that hydrolysis with hydrochloric acid is substantially complete after 1 hour at about 100° C., and that the hydrolysis product is substantially unaffected after 3 hours at this temperature. When the hydrolysis is carried out using aqueous alkaline solution, as for example, 10% sodium hydroxide, the time required for complete hydrolysis is substantially increased and some decomposition of dl-threonine occurs.

When the oxazoline derivative is prepared by treatment of a crude hydrogenation product containing about 85% N-acyl-dl-allothreonine, and the crude oxazoline hydrolyzed, the product contains about 15% dl-allothereonine impurity.

When the N-acyl-allothreonine esters are purified before converting to the oxazoline derivative, or where the oxazoline derivative is itself recrystallized to produce the precursor of threonine in substantially pure form, the hydrolysis product contains only a small amount of allothreonine impurity. Substantially pure threonine can be obtained by recrystallizing the hydrolysis product directly from water and a lower aliphatic alcohol, such as ethyl alcohol.

Where it is desired to prepare the corresponding N-acyl-threonine ester, this is accomplished by partially hydrolyzing the oxazoline precursor of threonine referred to above. The partial hydrolysis can be carried out by allowing the oxazoline derivative to stand in contact with a mildly alkaline aqueous solution, as for example, aqueous sodium bicarbonate solution, for a time sufficient to completely hydrolyze the oxazoline ring. When this reaction is carried out at about 20° C. using about 5% sodium bicarbonate, the reaction is complete in about 15 hours. The hydrolysis product is isolated from the reaction mixture by any convenient method, as for example, by extraction with chloroform. The chloroform extract is then concentrated and the residue purified by recrystallization, preferably from a mixture of an aliphatic alcohol and a hydrocarbon solvent, such as isopropanol-petroleum ether to produce the desired N-acyl-threonine ester.

The following examples illustrate a method of carrying out the present invention, but it is to be understood that these examples are given by way of illustration and not of limitation.

*Example 1*

About 26 g. of methyl α-acetamido-β-ketobutyrate is dissolved in about 200 cc. water containing about 1.5 cc. of 1 N sodium hydroxide and about 0.26 g. of platinum oxide is added thereto. This mixture is shaken with hydrogen at about 25° C. and under about 30 lbs. per square inch pressure until hydrogen absorption is substantially complete, which requires about 3–4 hours. The reaction mixture is filtered to remove catalyst and the water is evaporated from the solution under reduced pressure. The residual oil is dried by azeotropic distillation with benzene to produce a mixture of stereoisomers of methyl α-acetamido-β-hydroxy-butyrate.

If desired, this hydrogenation product can be purified by fractional crystallization from a solvent such as ethyl acetate to produce substantially pure N-acetyl-dl-allothreonine methyl ester.

Alternatively, the crude hydrogenation product is dissolved in about 50 cc. benzene, and about 25 cc. of thionyl chloride is added dropwise to the solution. The mixture is stirred at a temperature of about 13–16° C., during the addition which requires approximately 20 minutes. The stirring is continued for approximately 2 hours additional time and the temperature is allowed to rise to about 30° C. during the first 20 minutes of this time, which temperature is maintained during the remainder of the stirring period. The reaction mixture is poured into about 100 cc. ice water and the benzene layer is separated and washed twice with approximately 15 cc. water. The combined aqueous extracts are washed with about 60 cc. benzene and then refluxed for about 2½ hours. The resulting aqueous solution is evaporated to dryness under reduced pressure to produce crude dl-threonine hydrochloride.

If desired, the benzene solution containing the reaction product of thionyl chloride and the methyl α-acetamido-β-hydroxy-butyrate stereoisomers can be poured into about 20 volumes of ether and the mixture allowed to crystallize at about 0° C. for approximately 20 hours. The crystalline product is recovered by filtration and dried to produce the 2,5-dimethyl-4-(carbomethoxy)-oxazoline hydrochloride.

*Example 2*

About 23 grams (0.01 mole) of ethyl α-benzamido-β-keto-butyrate, which can be prepared by catalytic hydrogenation of ethyl α-oximino-β-keto-butyrate in cyclohexane solution containing excess benzoic anhydride, is dissolved in about 20 cc. of alcohol containing about 0.1 gram of platinum oxide catalyst. This mixture is reacted with hydrogen at about 25° C. and under a pressure of about 30–40 pounds per square inch. Approximately the theoretical amount of hydrogen is absorbed in about 3 hours whereupon absorption ceases. The catalyst is removed by filtration, and the filtrate is evaporated to dryness under reduced pressure. The residual material is azeotropically distilled with benzene to remove the last traces of alcohol, whereby is obtained crude ethyl α-benzamido-β-hydroxy-butyrate. Hydrolysis of a sample of this material, followed by bioassay of the hydrolysis product indicates that the ethyl α-benzamido-β-keto-butyrate contains approximately 20% N-benzoyl-dl-threonine ethyl ester and about 80% N-benzoyl-dl-allothreonine ethyl ester.

A portion of said crude ethyl α-benzamido-β- hydroxy-butyrate corresponding to approximately 2.13 grams of ethyl α-benzamido-β-keto-butyrate starting material, is shaken with about 5 cc. of thionyl chloride until completely dissolved and the solution is allowed to stand for approximately 2 hours at about 20° C. This solution is then poured into about 20 volumes of ether and kept at 0° C. for about 20 hours whereupon 5-methyl-4-carboethoxy-2-phenyl-oxazoline crystallized and is recovered by filtration. Alternatively, the solution is poured into about 30 cc. of water and the aqueous solution heated under reflux for approximately 3 hours. The hydrolysis solution is then cooled to about 0 to 5° C., and the benzoic acid which precipitates is recovered by filtration. The filtrate is evaporated to dryness under reduced pressure, the residual material is redissolved in water, and the solution again evaporated to dryness to produce approximately 1.0 gram of crude dl-threonine; yield from ethyl α-benzamido-β-keto-butyrate 74.8% of theory; purity 80% by bioassay.

Example 3

About 66 g. of crude ethyl α-acetamido-β-keto-butyrate (M. P. 45–48° C.), is dissolved in about 525 cc. water containing about 5 cc. of 1 N sodium hydroxide solution and about 0.65 g. of platinum oxide. This mixture is then reacted with hydrogen at about 25° C. and under a pressure of about 30–40 pounds per square inch. The theoretical amount of hydrogen is absorbed in approximately 4 hours, no more being taken up in an additional hour. The catalyst is then filtered and the filtrate is evaporated to dryness under reduced pressure and the residue dehydrated by azeotropic distillation with benzene to produce about 66 g. of colorless heavy oil which consists of a mixture of stereoisomers of ethyl α-acetamido-β-hydroxy-butyrate; over 90% theory yield from the corresponding β-keto derivative. Hydrolysis of this material followed by bioassay of the hydrolysis product indicates that the oil contains approximately 15–20% N-acetyl-dl-threonine ethyl ester and about 80–85% N-acetyl-dl-allothreonine ethyl ester.

About 33 g. of the crude ethyl α-acetamido-β-hydroxy-butyrate, prepared above, is dissolved in above 40 cc. of benzene and the solution cooled to about 8° C. About 25 cc. of thionyl chloride is added dropwise with agitation over approximately a 15-minute period and the temperature is maintained at about 10–15° C. The reaction mixture is stirred for approximately 1 hour additional time during which time the temperature is allowed to rise to about 25° C. The reaction mixture is poured into about 965 cc. of anhydrous ether and the mixture allowed to crystallize at about 1° C. for approximately 15 hours. The crystalline product is filtered, washed with ether and dried in vacuo over concentrated sulfuric acid to produce approximately 31 g. of crude 2,5-dimethyl-4-(carboethoxy)-oxazoline hydrochloride; M. P. 95–98° C. (sealed tube); yield from ethyl α-acetamido-β-keto-butyrate equals 85.4% theory.

About 16 g. of this crystalline 2,5-dimethyl-4-(carboethoxy)-oxazoline hydrochloride is dissolved in about 132 cc. of 10% hydrochloric acid and the solution refluxed for about 1 hour. Bioassay of the resulting solution indicates a dl-threonine content of about 7.3 g., which corresponds to approximately 83% theory yield based on the crude oxazoline hydrochloride. The solution is then evaporated to dryness under reduced pressure, the residue redissolved in absolute ethyl alcohol and again evaporated to dryness. The brown gummy residue is then dissolved in about 170 cc. absolute alcohol, filtered and about 21 cc. of pyridine is added thereto and the solution is allowed to crystallize at about 0° C. for approximately 60 hours. The crystalline product is filtered, washed with alcohol and ether and dried to produce about 6.3 g. of crude dl-threonine; M. P. 218–219° C.; yield from oxazoline 74.5% theory; purity 90.6% by bioassay.

Example 4

Ethyl α-acetamido-β-keto-butyrate is hydrogenated as described in Example 2 and about 10 g. of the crude hydrogenation product which contains approximately 15–20% N-acetyl-dl-threonine ethyl ester and about 80–85% N-acetyl-dl-allothreonine ethyl ester is dissolved in about 15 cc. hot ethyl acetate and the solution seeded with crystals of N-acetyl-dl-allothreonine ethyl ester. The product which crystallizes is filtered and recrystallized twice more to produce approximately 4 g. of substantially pure N-acetyl-dl-allothreonine ethyl ester; M. P. 76–78° C. When this is hydrolyzed by refluxing for about 2½ hours with 10% aqueous hydrochloric acid, and the hydrolyzed product assayed microbially, it is found to contain less than .8% dl-threonine which indicates that the N-acetyl-dl-allothreonine ethyl ester is about 99% pure.

About 9.5 g. of this substantially pure N-acetyl-dl-allothreonine ethyl ester is dissolved in about 15 cc. of benzene and the solution cooled to about 15° C. About 8 cc. of thionyl chloride is added to the solution with agitation over a 20-minute period and at a temperature of approximately 13–16° C. Following the addition, the stirring is continued and the temperature is allowed to rise to about 30° C. over a one-half hour period and the solution is then stirred at 30° C. for approximately 1½ hours additional time. The reaction mixture can then be poured into ether whereupon substantially pure 2,5-dimethyl-4-carboethoxy oxazoline hydrochloride crystallizes and is recovered by filtration and dried; M. P. 101–102° C. Alternatively the benzene solution is poured into about 30 cc. ice water, the benzene layer separated, and washed with water and the combined aqueous extracts refluxed for about 2½ hours to completely hydrolyze the oxazoline derivative. The aqueous extract is then evaporated under reduced pressure, the residue redissolved in water and again evaporated to dryness. This residue is then dissolved in water, neutralized with aqueous sodium hydroxide solution and the dl-threonine content determined by bioassay. The amount of dl-threonine is about 5.6 g. which corresponds to about 95% yield of that theoretically obtainable by inversion of the starting allo derivative.

Example 5

About 65 g. of ethyl α-acetamido-β-keto-butyrate is hydrogenated in the manner described in Example 3 to produce the colorless oil ethyl α-acetamido-β-hydroxy-butyrate. Hydrolysis of a sample of this oil, followed by bioassay, shows a yield of approximately 17.8% theory of dl-threonine which indicates that the oil contains about 18% N-acetyl-dl-threonine ethyl ester and about 82% N-acetyl-dl-allothreonine ethyl ester. About 33 g. of this oil corresponding to about 33 g. of starting α-acetamido-β-keto-ethyl butyrate is then dissolved in about 25 cc. of hot ethyl acetate, filtered to remove inorganic salt impurities, cooled to approximately 0° C. and allowed to crystallize over a 15-hour period. The crystalline product is filtered, washed with approximately 50 cc. cold ethyl acetate and dried to produce approximately 17.5 g. of substantially pure N-acetyl-dl-allothreonine ethyl ester; M. P. 68–74° C.; recovery yield approximately 65% based on the estimated N-acetyl-dl-allothreonine ethyl ester content of the oil; estimated purity, based on hydrolysis and bioassay of dl-threonine impurity, equals 96.4%.

About 16.0 g. of the above allo ester is dissolved in about 17.3 cc. benzene and the solution cooled to approximately 10° C. About 14 cc. of thionyl chloride is added dropwise to this solution, with agitation, in approximately 1 hour and at a temperature of approximately 13–15° C. The temperature is then allowed to rise over approximately a half hour period to about 30° C. and the solution is then stirred for an additional hour at this temperature. The solution is then cooled and about 43 cc. of ice water is added slowly, maintaining the temperature below about 10° C. The layers are then separated and the benzene is washed twice with about 12 cc. water, the combined aqueous extracts are washed with about 5 cc. benzene and then refluxed for approximately 2½ hours. This solution is then treated with activated charcoal, filtered and a sample evaluated by bioassay which shows approximately 8.6 g. of dl-threonine content in the solution remaining after the sample had been withdrawn for the assay. The remaining solution is then evaporated to dryness, the residue redissolved in water and again evaporated to dryness. The colorless residue is dissolved in about 62 cc. hot isopropanol, about 15 cc. of aniline is added and the mixture shaken for approximately 15 hours at about 25° C. and the dl-threonine which crystallizes is filtered and washed four times with approximately 4 cc. isopropanol. This product is dried to yield about 8.6 g. of dl-threonine; M.P. 219° C. (98.6% pure bioassay). This product can be crystallized from approximately 5 parts of water and 12 parts of ethyl alcohol to give about 90% recovery yield of substantially pure dl-threonine; M. P. 230° C. with decomposition; bioassay shows 100% dl-threonine within the experimental error of determination.

Example 6

Crude 2,5-dimethyl-(4-carboethoxy)-oxazoline hydrochloride prepared as described in Example 3 and hydrolyzed by boiling approximately 2½ hours with 10% hydrochloric acid, the method employed in said Example 3, gives approximately an 83% of theory yield of dl-threonine. The results obtained by this procedure are compared in the following table with those obtained by acid hydrolysis for shorter time and with hydrolysis using an aqueous sodium hydroxide solution.

| Expt. | Hydrolyzing Agent | Time Heated At Boiling | Yield of dl-threonine Per Cent Theory from Oxazoline |
|---|---|---|---|
| | | Hours | Per cent |
| 1 | 10% HCl | 2½ | 83 |
| 2 | do | 1 | 82 |
| 3 | 2.5 N NaOH | 3 | 52 |
| 4 | do | 1 | 39 |

It will be observed that although hydrolysis is substantially complete after 1 hour refluxing with 10% hydrochloric acid solution, hydrolysis is incomplete after 1 hour hydrolysis with 2.5 N sodium hydroxide solution. Furthermore, the optimum yields by the alkaline hydrolysis is much lower.

When pure dl-threonine is heated with aqueous or alkaline solution according to the above processes used for hydrolyzing the oxazoline derivative, and the resulting solution assayed microbially for dl-threonine content, the following results are obtained

| Expt. | Hydrolyzing Agent | Time Heated At Boiling | Recovery of dl-threonine |
|---|---|---|---|
| | | Hours | Per cent |
| 1 | 10% HCl | 3 | 96 |
| 2 | 2.5 N NaOH | 1 | 94 |
| 3 | do | 4 | 76 |

It is seen that the decomposition of dl-threonine by boiling for 3 hours with 10% hydrochloric acid is less than 4%, whereas the decomposition after 4 hours boiling with 2.5 N sodium hydroxide is 24%.

Example 7

If desired, the crude 2,5-dimethyl-(4-carboethoxy)-oxazoline hydrochloride, prepared as described in Example 2 above, can be purified as follows: About 5 g. of crude material is dissolved in about 16 cc. of chloroform and about 90 cc. of dry ether is added slowly to the chloroform solution whereupon oxazoline hydrochloride precipitates, is filtered, and is again recrystallized by the same procedure and dried to produce substantially pure material; M. P. 105–106° C.

About 3 g. of this purified 2,5-dimethyl-(4-carboethoxy)-oxazoline hydrochloride is dissolved in about 25 cc. of 10% hydrochloric acid and the solution refluxed for about 2 hours and then evaporated to dryness under reduced pressure, the residue redissolved in water and again evaporated to dryness. Bioassay of this product indicates that hydrolysis of the purified oxazoline hydrochloride gives a yield of dl-threonine of approximately 92% of theory.

Example 8

About 3.11 g. of 2,5-dimethyl-(4-carboethoxy)-oxazoline hydrochloride (M. P. 102–103° C.) is added to a solution containing about 1.4 g. of sodium bicarbonate in about 20 cc. water. This mixture is allowed to stand for about 15 hours at approximately 20° C. and then extracted repeatedly with chloroform. The extract is washed with water, dried over sodium sulfate and evaporated to produce an oil which crystallizes upon cooling and is purified by recrystallization from isopropanol-petroleum ether to yield substantially pure N-acetyl-dl-threonine ethyl ester; M. P. 84–85° C.

2,5-dimethyl-4-(carbomethoxy)-oxazoline hydrochloride, which is prepared as described in Example 1, can be partially hydrolyzed substantially as described in the preceding paragraph and the product purified by recrystallization from benzene to produce substantially pure N-acetyl-dl-threonine methyl ester; M. P. 105–106° C.

Modifications may be made in carrying out the present invention without departing from the spirit and scope thereof, and the invention is to be limited only by the appended claims.

We claim:
1. The process for preparing derivatives of allothreonine which comprises reacting a compound represented by the formula:

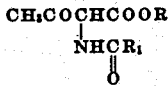

wherein R is an alkyl group and $R_1$ is selected from the group consisting of alkyl and aryl radicals, with hydrogen in the presence of a hydrogenation catalyst to produce a compound of the formula:

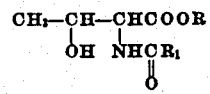

wherein R and $R_1$ have the significance above defined.

2. The process which comprises reacting ethyl α-acetamido-β-keto-butyrate with hydrogen in the presence of platinum oxide catalyst to produce a mixture of stereoisomeric racemates of ethyl α-acetamido-β-hydroxy-butyrate containing a preponderant amount of the ethyl ester of N-acetyl-dl-allothreonine.

3. The process which comprises reacting methyl α-acetamido-β-keto-butyrate with hydrogen in the presence of platinum oxide catalyst to produce a mixture of stereoisomeric racemates of methyl α-acetamido-β-hydroxy-butyrate containing a preponderant amount of the methyl ester of N-acetyl-dl-allothreonine.

4. The process which comprises reacting ethyl α-acetamido-β-keto-butyrate with hydrogen in the presence of platinum oxide catalyst to produce a mixture of stereoisomeric racemates of ethyl α-acetamido-β-hydroxy-butyrate containing a preponderant amount of the ethyl ester of N-acetyl-dl-allothreonine; and separating the ethyl ester of N-acetyl-dl-allothreonine from said mixture by fractional crystallization to produce substantially pure N-acetyl-dl-allothreonine ethyl ester.

5. The process which comprises reacting methyl α-acetamido-β-keto-butyrate with hydrogen in the presence of platinum oxide catalyst to produce a mixture of stereoisomeric racemates of methyl α-acetamido-β-hydroxy-butyrate containing a preponderant amount of the methyl ester of N-acetyl-dl-allothreonine; and separating the methyl ester of N-acetyl-dl-allothreonine from said mixture by fractional crystallization to produce substantially pure N-acetyl-dl-allothreonine methyl ester.

6. The process that comprises reacting ethyl α-benzoylamido-β-ketobutyrate with hydrogen in the presence of platinum oxide catalyst to produce a mixture of stereoisomeric racemates of ethyl α-benzoylamido-β-hydroxy butyrate containing a preponderant amount of the ethyl ester of N-benzoyl-dl-allothreonine.

KARL PFISTER, III.
MAX TISHLER.

REFERENCES CITED

The following references are of record in the file of this patent:

UNITED STATES PATENTS

| Number | Name | Date |
|---|---|---|
| 2,446,651 | Hartung | Aug. 10, 1948 |

FOREIGN PATENTS

| Number | Country | Date |
|---|---|---|
| 364,038 | Germany | Nov. 16, 1922 |

OTHER REFERENCES

Erlenmeyer et al.: "Liebig's Annalen," vol. 337 (1904), pp. 253–254.

Bergmann et al.: "Zeit. Physiol. Chem.," vol. 140 (1924), pp. 129, 135–141.

Carter, et al.: "J. Biol. Chem.," vol. 129 (1934), p. 362.

Abderhalden et al.: "Ber. deut. Chem.," vol. 67 (1934), p. 545.

West et al.: "J. Biol. Chem.," vol. 122 (1938), pp. 611–612.

Carter et al.: "J. Biol. Chem.," vol. 138 (1941), pp. 627–629.